United States Patent
Döbler et al.

(10) Patent No.: US 7,169,333 B2
(45) Date of Patent: Jan. 30, 2007

(54) ANTISTATIC AGENT

(75) Inventors: Martin Döbler, Düsseldorf (DE);
Walter Köhler, Duisburg (DE);
Siegfried Neumann, Tönisvorst (DE)

(73) Assignee: Bayer Aktiengesellschaft, Leverkusen (DE)

( * ) Notice: Subject to any disclaimer, the term of this patent is extended or adjusted under 35 U.S.C. 154(b) by 397 days.

(21) Appl. No.: 10/275,677

(22) PCT Filed: Apr. 30, 2001

(86) PCT No.: PCT/EP01/04845

§ 371 (c)(1),
(2), (4) Date: Nov. 7, 2002

(87) PCT Pub. No.: WO01/85869

PCT Pub. Date: Nov. 15, 2001

(65) Prior Publication Data

US 2003/0139503 A1    Jul. 24, 2003

(30) Foreign Application Priority Data

May 12, 2000 (DE) ............... 100 34 945
Dec. 27, 2000 (DE) ............... 100 65 439

(51) Int. Cl.
*H01B 1/12* (2006.01)
*C08F 8/00* (2006.01)
*C08L 69/00* (2006.01)
*C07C 309/00* (2006.01)

(52) U.S. Cl. .......... 252/519.3; 252/500; 252/511; 264/464; 264/478; 524/146; 562/105; 562/113

(58) Field of Classification Search .......... 252/500, 252/511, 622, 519.3; 524/99, 392; 264/452, 264/453; 562/113; 525/146; 526/242; 528/44
See application file for complete search history.

(56) References Cited

U.S. PATENT DOCUMENTS

| | | | |
|---|---|---|---|
| 2,964,794 A | 12/1960 | Peilstöcker et al. | 18/55 |
| 3,723,512 A * | 3/1973 | Niederprum et al. | 562/113 |
| 4,041,003 A * | 8/1977 | Adelmann et al. | 524/87 |
| 5,288,778 A | 2/1994 | Schmitter et al. | 524/100 |
| 5,418,128 A * | 5/1995 | Orem | 430/631 |
| 5,883,165 A | 3/1999 | Kröhnke et al. | 524/111 |
| 5,910,517 A | 6/1999 | Woo | 522/78 |
| 6,372,829 B1* | 4/2002 | Lamanna et al. | 524/99 |
| 2002/0123544 A1* | 9/2002 | Gohr et al. | 524/155 |

FOREIGN PATENT DOCUMENTS

| | | |
|---|---|---|
| DE | 1 137 167 | 9/1962 |
| DE | 1 785 137 | 1/1972 |
| DE | 19 66 931 | 5/1975 |
| DE | 2506726 * | 8/1976 |
| DE | 2506726 A * | 8/1976 |
| DE | 19943637 * | 2/2001 |
| DE | 19943637 A1 * | 2/2001 |
| EP | 0 089 801 | 9/1983 |
| EP | 0 873 986 | 10/1998 |
| GB | 838824 | 6/1960 |
| GB | 1 592 724 | 7/1981 |
| JP | 6-228420 | 8/1994 |
| NL | 7802830 | 9/1979 |
| WO | 01/12713 | 2/2001 |
| WO | 01/25326 | 4/2001 |

* cited by examiner

*Primary Examiner*—Mark Kopec
*Assistant Examiner*—Kallambella Vijayakumar
(74) *Attorney, Agent, or Firm*—Joseph C. Gil; Robert S. Klemz; John E. Mrozinski, Jr.

(57) ABSTRACT

The present invention provides an antistatic agent of the formula (I)

$$R\text{—}SO_3NR'R''R'''R''''\qquad(I)$$

wherein R represents a perfluorinated cyclic or linear, branched or unbranched carbon chain having 1 to 30 carbon atoms, R' represents a cyclic or linear, branched or unbranched carbon chain having 1 to 30 carbon atoms, which is unsubstituted or substituted with halogen, hydroxy, cycloalkyl or alkyl, and R'', R''', R'''' independently represent a cyclic or linear, branched or unbranched carbon chain having 1 to 30 carbon atoms, which is unsubstituted or substituted with halogen, hydroxy, cycloalkyl or alkyl, with the proviso that at least one of the radicals R', R'', R''' and R'''' must not represent ethyl. The antistatic agent of the present invention may be incorporated in plastic molding materials to provide antistatic properties thereto.

10 Claims, No Drawings

US 7,169,333 B2

ANTISTATIC AGENT

FIELD OF THE INVENTION

The application relates to moulding compositions prepared specific quaternary ammonium salts of perfluoroalkylsulfonic acids and thermoplastics, which have an antistatic effect and are non-yellowing during processing.

BACKGROUND OF THE INVENTION

The fixation of dust with the formation of visual effects of dust is a widespread problem with plastic mouldings. In this context see, for example, Saechtling, Kunststoff-Taschenbuch, 26th edition, Hanser Verlag, 1995, Munich, p. 140 et seq. Dust deposits are a particular nuisance in transparent mouldings where they compromise function. Such mouldings are used, for example, for the optical data storage sector, in electrical engineering and automotive construction, in the building construction sector, for containers for liquids or for other optical applications. The fixation of dust is undesirable in all these applications and may impair function.

A known method of reducing the fixation of dust on plastic bodies is the use of antistatic agents. The literature describes antistatic agents for thermoplastics (see, for example, Gächter, Müller, Plastic Additives, Hanser Verlag, Munich, 1996, p. 749 et seq.), which limit the fixation of dust. These antistatic agents improve the electrical conductivity of the plastic moulding compositions and in this manner dissipate surface charges which form during manufacture and use. Dust particles are consequently attracted to a lesser extent, and the fixation of dust is hence reduced.

A distinction is generally made between internal and external antistatic agents. An external antistatic agent is applied to the plastic moulding after processing, an internal antistatic agent is added to the plastic moulding compositions as an additive. The use of internal antistatic agents is generally desirable for economic reasons, since no additional working steps are necessary for applying an antistatic agent after processing.

Those internal antistatic agents for thermoplastics which have been described hitherto in the literature generally have one or more of the following disadvantages:
  breakdown of molecular weight of the thermoplastic
  effectiveness only at high concentrations (>0.5%)
  turbidity in transparent thermoplastics
  insufficient effect to enable electrostatic discharge to take place, for example after injection moulding, and thus to avoid the fixation of dust
  discoloration.

Sulfonic acid salts are a class of antistatic agents frequently described for use in thermoplastics. For example JP-06228420 A 940816 describes aliphatic sulfonic acid ammonium salts in polycarbonate as an antistatic agent. However, these compounds lead to breakdown of molecular weight.

Quaternary ammonium salts of perfluoroalkylsulfonic acids are known, likewise the use thereof in thermoplastics, as in DE 2 506 726, for example. The latter application describes quaternary ammonium salts of perfluoroalkylsulfonic acids as mould release agents for polycarbonate. The examples described in that application, however, lead in polycarbonate to marked yellowing during processing, which is undesirable in particular for transparent and white-coloured formulations.

DETAILED DESCRIPTION OF THE INVENTION

The object of the invention is therefore to provide antistatic agents having no negative influence on the material properties of plastics.

It has surprisingly been found that certain perfluoroalkylsulfonic acid salts are particularly suitable as antistatic agents for the production of injection-moulded and extruded mouldings. Even with small quantities of perfluoroalkylsulfonic acid salt, mouldings can be produced on which there is no longer fixation of dust and yet which have none of those disadvantages of conventional antistatic agents mentioned at the outset.

The present application therefore provides moulding compositions consisting of:
  at least one thermoplastic and
  at least one quaternary ammonium salt of a perfluoroalkylsulfonic acid of the type (I)

$$R-SO_3NR'R''R'''R'''' \qquad (I)$$

in which
  R denotes perfluorinated cyclic or linear, branched or unbranched carbon chains having 1 to 30 carbon atoms, preferably 4 to 8 carbon atoms, preferably having in the case of cyclic radicals 5 to 7 carbon atoms;
  R' denotes cyclic or linear, branched or unbranched carbon chains having 1 to 30 carbon atoms, preferably 3 to 10 carbon atoms, preferably having in the case of cyclic radicals 5 to 7 carbon atoms, which are unsubstituted or are substituted with halogen, hydroxy, cycloalkyl or alkyl, in particular with $C_1$ to $C_3$-alkyl or $C_5$ to $C_7$-cycloalkyl, particularly preferably propyl, 1-butyl, 1-pentyl, hexyl, isopropyl, isobutyl, tert.-butyl, neopentyl, 2-pentyl, isopentyl, isohexyl, cyclohexyl, cyclohexylmethyl and cyclopentyl;
  R'', R''', R'''' in each case independently of one another denote cyclic or linear, branched or unbranched carbon chains having 1 to 30 carbon atoms, preferably 1 to 10 carbon atoms, preferably having in the case of cyclic radicals 5 to 7 carbon atoms, which are unsubstituted or are substituted with halogen, hydroxy, cycloalkyl or alkyl, in particular with $C_1$ to $C_3$-alkyl or $C_5$ to $C_7$-cycloalkyl, particularly preferably methyl, ethyl, propyl, 1-butyl, 1-pentyl, hexyl, isopropyl, isobutyl, tert.-butyl, neopentyl, 2-pentyl, isopentyl, isohexyl, cyclohexyl, cyclohexylmethyl and cyclopentyl,
  with the proviso that at least one of the radicals R' to R'''' does not stand for ethyl.

Here, the ammonium salts in which
R denotes perfluorinated linear or branched carbon chains having 1 to 30 carbon atoms, preferably 4 to 8 carbon atoms;
  R' denotes halogenated or non-halogenated linear or branched carbon chains having 1 to 30 carbon atoms, preferably 3 to 10 carbon atoms; propyl, 1-butyl, 1-pentyl, hexyl, isopropyl, isobutyl, tert.-butyl, neopentyl, 2-pentyl, isopentyl, isohexyl are particularly preferred;
  R'', R''', R'''' in each case independently of one another denote halogenated or non-halogenated linear or branched carbon chains having 1 to 30 carbon atoms, preferably 1 to 10 carbon atoms; methyl, ethyl, propyl, 1-butyl, 1-pentyl, hexyl, isopropyl, isobutyl, tert.-butyl, neopentyl, 2-pentyl, isopentyl, isohexyl are particularly preferred,
with the proviso that at least one of the radicals R' to R'''' does not stand for ethyl,
represent a preferred choice.

As an option further conventionally used polymer additives are comprised in the plastic moulding compositions according to the invention.

Preferred quaternary ammonium salts within the meaning of the invention are:
perfluorooctanesulfonic acid tetrapropylammonium salt,
perfluorobutanesulfonic acid tetrapropylammonium salt,
perfluorooctanesulfonic acid tetrabutylammonium salt,
perfluorobutanesulfonic acid tetrabutylammonium salt,
perfluorooctanesulfonic acid tetrapentylammonium salt,
perfluorobutanesulfonic acid tetrapentylammonium salt,
perfluorooctanesulfonic acid tetrahexylammonium salt,
perfluorobutanesulfonic acid tetrahexylammonium salt,
perfluorobutanesulfonic acid trimethylneopentylammonium salt,
perfluorooctanesulfonic acid trimethylneopentylammonium salt,
perfluorobutanesulfonic acid dimethyldineopentylammonium salt,
perfluorooctanesulfonic acid dimethyldineopentylammonium salt,
N-methyltripropylammonium perfluorobutyl sulfonate,
N-ethyltripropylammonium perfluorobutyl sulfonate,
tetrapropylammonium perfluorobutyl sulfonate,
dimethyldiisopropylammonium perfluorobutyl sulfonate,
N-methyltributylammonium perfluorobutyl sulfonate,
cyclohexyldiethylmethylammonium perfluorobutyl sulfonate,
cyclohexyltrimethylammonium perfluorobutyl sulfonate,
N-methyltripropylammonium perfluorooctyl sulfonate,
N-ethyltripropylammonium perfluorooctyl sulfonate,
tetrapropylammonium perfluorooctyl sulfonate,
dimethyldiisopropylammonium perfluorooctyl sulfonate,
N-methyltributylammonium perfluorooctyl sulfonate,
cyclohexyldiethylmethylammonium perfluorooctyl sulfonate,
cyclohexyltrimethylammonium perfluorooctyl sulfonate.

In particular, each individual salt of those named is also preferably suitable.

Mixtures of sulfonic acid salts, in particular of the sulfonic acid salts named above, are also preferred.

The perfluorooctanesulfonic acid tetrapropylammonium salt, perfluorooctanesulfonic acid tetrabutylammonium salt, perfluorooctanesulfonic acid tetrapentylammonium salt, perfluorooctanesulfonic acid tetrahexylammonium salt, N-methyl tripropylammonium perfluorooctyl sulfonate, dimethyldiisopropylammonium perfluorooctyl sulfonate, N-methyltributylammonium perfluorooctyl sulfonate, cyclohexyldiethyl-methylammonium perfluorooctyl sulfonate, and cyclohexyltrimethylammonium perfluorooctyl sulfonate, as well as the corresponding perfluorobutanesulfonic acid salts, are particularly preferred.

The perfluoroalkylsulfonic acid ammonium salts are known or may be prepared by known methods. The salts of the sulfonic acids may be prepared by combining equimolar quantities of the free sulfonic acid with the hydroxy form of the corresponding cation in water at room temperature and concentrating the solution. Other preparation methods are described, for example, in DE 1 966 931 and NL 7 802 830.

The perfluoroalkylsulfonic acid ammonium salts are preferably added in quantities of from 0.001 to 2 wt. %, preferably 0.1 to 1 wt. %, to the plastics.

Thermoplastics which are suitable within the meaning of the invention are understood to be in particular transparent thermoplastics, preferably polymers of ethylenically unsaturated monomers and/or polycondensates of bifunctional reactive compounds.

Particularly suitable plastics are polycarbonates or copolycarbonates based on diphenols, polyacrylates or copolyacrylates and polymethacrylates or copolymethacrylates such as, for example and preferably, polymethyl methacrylate, polymers or copolymers with styrene such as, for example and preferably, transparent polystyrene or polystyrene acrylonitrile (SAN), transparent thermoplastic polyurethanes, as well as polyolefins such as, for example and preferably, transparent polypropylene types or polyolefins based on cyclic olefins (for example TOPAS® from Hoechst), polycondensates or copolycondensates of terephthalic acid such as, for example and preferably, polyethylene terephthalate or copolyethylene terephthalate (PET or CoPET) or glycol-modified PET (PETG).

Polycarbonates or copolycarbonates, in particular non-halogenated polycarbonates and/or copolycarbonates of molecular weights $\overline{M}_W$ from 500 to 100 000, preferably 10 000 to 50 000, particularly preferably 15 000 to 40 000, are in particular preferred.

Thermoplastic aromatic polycarbonates within the meaning of the present invention are both homopolycarbonates and also copolycarbonates; the polycarbonates may be linear or branched in known manner.

The polycarbonates according to the invention may be present in fully or partially brominated form.

These polycarbonates are prepared in known manner from diphenols, carbonic acid derivatives, optionally chain terminators and optionally branching agents.

Many patent specifications over a period of some 40 years have documented details of polycarbonate preparation. Reference is made here only to Schnell, "Chemistry and Physics of Polycarbonates", Polymer Reviews, Vol. 9, Interscience Publishers, New York, London, Sydney 1964, D. Freitag, U. Grigo, P. R. Müller, H. Nouvertne', BAYER AG, "Polycarbonates" in the Encyclopedia of Polymer Science and Engineering, Vol. 11, second edition, 1988, pp. 648 to 718, and finally to Drs. U. Grigo, K. Kirchner and P. R. Müller "Polycarbonate" in Becker/Braun, Kunststoff-Handbuch, Vol. 3/1, Polycarbonates, polyacetals, polyesters, cellulose esters, Carl Hanser Verlag, Munich, Vienna 1992, pp. 117 to 299, by way of example.

Diphenols for the polycarbonate preparation are preferably:
4,4'-dihydroxydiphenyl, 2,2-bis(4-hydroxyphenyl) propane, 2,4-bis(4-hydroxyphenyl)-2-methylbutane, 1,1-bis(4-hydroxyphenyl)-p-diisopropylbenzene, 2,2-bis(3-methyl-4-hydroxyphenyl) propane, 2,2-bis(3-chloro-4-hydroxyphenyl) propane, bis(3,5-dimethyl-4-hydroxyphenyl) methane, 2,2-bis(3,5-dimethyl-4-hydroxyphenyl) propane, bis(3,5-dimethyl-4-hydroxyphenyl) sulfone, 2,4-bis (3,5-dimethyl-4-hydroxyphenyl)-2-methylbutane, 1,1-bis (3,5-dimethyl-4-hydroxyphenyl)-p-diisopropylbenzene, 2,2-bis(3,5-dichloro-4-hydroxyphenyl) propane, 2,2-bis (3,5-dibromo-4-hydroxyphenyl) propane and 1,1-bis(4-hydroxyphenyl)-3,3,5-trimethylcyclohexane.

Particularly preferred diphenols are 2,2-bis(4-hydroxyphenyl) propane, 2,2-bis(3,5-dimethyl-4-hydroxyphenyl) propane, 2,2-bis(3,5-dichloro-4-hydroxyphenyl) propane, 2,2-bis(3,5-dibromo-4-hydroxyphenyl) propane, 1,1-bis(4-hydroxyphenyl)cyclohexane and 1,1-bis(4-hydroxyphenyl)-3,3,5-trimethylcyclohexane.

Preferred branching agents are triphenols, trimesic acid (trichloride), cyanuric acid trichloride and 3,3-bis(3-methyl-4-hydroxyphenyl)-2-oxo-2,3-dihydroindole.

In order to achieve improved plastic compositions, it is possible within the meaning of the invention to incorporate additionally at least one further additive normally present in thermoplastic polymers, preferably polycarbonates and copolycarbonates, such as, for example stabilisers (such as, for example, those described in EP 0 839 623 A1 or EP 0 500 496 A1), particularly heat stabilisers, in particular organic phosphites or phosphines, for example and preferably, triphenylphosphine, mould release agents, for example and preferably, fatty acid esters of glycerin or tetramethanolmethane, wherein unsaturated fatty acids may be fully or partially epoxidised, in particular glycerin monostearate or pentaerythritol tetrastearate (PETS), flame retardants, UV absorbers, for example and preferably, hydroxybenzotriazoles and hydroxytriazines, fillers, blowing agents, dyes, pigments, optical brighteners, transesterification catalysts and nucleating agents or the like, preferably in quantities of in each case up to 5 wt. %, preferably 0.01 to 5 wt. %, in relation to the total mixture, particularly preferably 0.01 wt. % to 1 wt. %, in relation to the quantity of plastic.

The perfluoroalkylsulfonic acid salts as well as optionally the additives or mixtures of additives are generally incorporated in the conventional manner, for example before or during polymerisation or by subsequent mixing with the plastic.

The plastic compositions thus obtained are generally present in the form of solutions, dispersions, emulsions, dusts, powders, granules, platelets or flakes (moulding compositions) and are used to produce moulded articles (mouldings).

Moulded articles are, for example and preferably, translucent articles such as, for example and preferably, light-diffusing discs for vehicles, lenses such as, for example, spectacle glasses, films, tapes, sheets, multi-wall sheets, multi-surface sheets, vessels, tubes and other profiles produced by conventional methods such as, for example, hot pressing, spinning, extrusion or injection moulding. The polymer compositions may also be processed to form cast films.

Possible uses of the plastic compositions according to the invention are:
1. splinterproof panes which are a known requirement in many areas of buildings, vehicles and aircraft, as well as helmet visors;
2. manufacture of extruded and solution-cast films for displays or electrical monitors, also ski foils;
3. manufacture of blow-mouldings (see, for example, U.S. Pat. No. 2,964,794);
4. manufacture of translucent sheets, in particular of twin-wall sheets, for example for roofing structures such as railway stations, greenhouses and lighting installations;
5. for the manufacture of traffic light housings or road signs;
6. for the manufacture of foam materials (see, for example, DE-AS 1 031 507);
7. for the manufacture of threads and wires (see, for example, DE-AS 1 137 167 and DE-OS 1 785 137);
8. as translucent plastics having a glass fibre content for lighting engineering purposes (see, for example, DE-OS 1 554 020);
9. for the manufacture of precision injection-moulded parts such as, for example, lens mounts. For this purpose polycarbonates having a fibre glass content are used, which optionally comprise additionally approximately 1 to 10 wt. % $MoS_2$, in relation to the total weight;
10. optical applications such as optical memories (CDs, DVDs), protective spectacles or lenses for photographic and cinematographic cameras (see, for example, DE-OS 2 701 173);
11. as light transmission carriers, in particular as fibre-optic wave guide cables (see, for example, EP-A1 0 089 801);
12. as electrical insulating materials for electrical conductors and for plug housings as well as pin and socket connectors;
13. as a carrier material for organic photoconductors;
14. for the manufacture of lights, for example searchlight lamps, as so-called headlamps or diffused light discs or lamp covers;
15. for medical applications, for example oxygenators, dialysers;
16. for food applications such as, for example, bottles, tableware and chocolate moulds;
17. for automotive sector applications where there may be contact with fuels and lubricants;
18. for sporting articles such as, for example, slalom poles;
19. for household articles such as, for example, kitchen sinks and letterbox housings;
20. for housings such as, for example, electrical distribution cabinets, electrical appliances, domestic appliances;
21. components of household articles, electrical and electronic equipment;
22. for the manufacture of motorcycle helmets and protective helmets;
23. automotive components such as glazing, instrument panels, bodywork parts and shock absorbers;
24. for other applications such as, for example, doors for stall-feeding, or animal cages;.

the use of the plastic compositions according to the invention for
1. splinterproof panes which are a known requirement in many areas of buildings, vehicles and aircraft, as well as helmet visors;
2. manufacture of translucent sheets, in particular of twin-wall sheets, for example for roofing structures such as railway stations, greenhouses and lighting installations;
3. optical applications such as optical memories (CDs, DVDs), protective spectacles or lenses for photographic and cinematographic cameras (see, for example, DE-OS 2 701 173);
4. for housings such as, for example, electrical distribution cabinets, electrical appliances, domestic appliances;
5. for the manufacture of lights, for example searchlight lamps, as so-called headlamps or diffused light discs or lamp covers;
6. for the manufacture of motorcycle helmets and protective helmets;

is here preferred.

The use of the plastic composition according to the invention is also attractive for the production of multi-layer systems. Here, the plastic composition according to the invention is applied in a thin layer to a moulded article of a plastic not equipped to be antistatic. It may be applied concurrently with moulding or directly after the moulding has been moulded, for example by coextrusion or sandwich moulding. However, it may also be applied to the finished basic body after moulding, for example by lamination with a film or by coating with a solution.

Plastic compositions comprising perfluoroalkylsulfonic acid ammonium salts are preferably used for the production of light-diffusing discs for vehicles.

The use of plastic compositions comprising perfluoroalkylsulfonic acid salts is also particularly attractive for the production of sheets, twin-wall sheets, coextruded sheets and films. Furthermore, the use of the perfluoroalkylsulfonic acid salts according to the invention is attractive in flame-retarded thermoplastic moulding compositions.

The plastic mouldings equipped with the antistatic agents according to the invention have the advantage of no longer becoming electrostatically charged, for example, during production, during stripping of the conventionally used protective films or during transport and storage.

The perfluoroalkylsulfonic acid ammonium salts according to the invention are particularly suitable for transparent formulations of thermoplastics, yet opaque formulations may also be equipped to be antistatic with the aid of these additives.

The plastic compositions according to the invention can also be obtained by way of so-called master batches in which the desired additive composition is already pre-mixed. Then, in accordance with the desired composition of the plastic, only corresponding quantities of this master batch are added to the polycarbonate, for example during compounding or prior to injection moulding.

The Examples which follow serve to explain the invention. The invention is not confined to the Examples. Percentages hereinbelow are by weight.

EXAMPLES

Dust Test

In order to investigate the fixation of dust in a laboratory test, the injection-moulded sheets are exposed to a fluidised dust atmosphere. For this purpose a 2-litre beaker having an 80 mm-long magnetic stirrer rod of triangular section is filled to a height of approximately 1 cm with dust (coal dust/20 g activated carbon, Riedel-de Haen, Seelze, Germany, product No. 18003). The dust is fluidised with the aid of a magnetic stirrer. After the stirrer has stopped the test moulding is exposed to this dusty atmosphere for 7 seconds. Depending on the test moulding used, a greater or lesser amount of dust becomes deposited on the test mouldings.

Evaluation of the fixation of dust (visual effects of dust) is visual. Sheets showing visual effects of dust received a negative (−) score, sheets virtually free of any visual effects of dust received a positive (+) score.

Example 1

6.25 g neopentylamine, 28 g tributylamine and 22 g DMF are introduced into a 500 ml three-necked flask. 40.8 g methyl iodide together with 14 ml DMF are added dropwise to this mixture, and stirring continues at room temperature for 12 hours. The solution is precipitated in ethyl acetate and dried. 2.4 g of colourless crystals are obtained. Neopentylamine is obtainable from Pfaltz & Bauer, Waterbury, Conn., USA.

Example 2

9.6 g of the compound from Example 1 is dissolved in 96 ml water and is passed through a column packed with 260 g Lewatit M 500 in hydroxy form. The solution obtained is neutralised with perfluorooctanesulfonic acid (from Fluka) and concentrated to dryness. Perfluorobutanesulfonic acid trimethylneopentylammonium salt is obtained.

Example 3

Perfluorobutanesulfonic acid trimethylphenylammonium salt is prepared by neutralising perfluorobutanesulfonic acid and trimethylphenylammonium hydroxide in aqueous solution. The perfluorobutanesulfonic acid can be liberated by the action of concentrated sulfuric acid on the potassium salt of the sulfonic acid and isolated by distillation. The potassium salt is obtainable from Aldrich. Trimethylphenylammonium hydroxide can be prepared from trimethylphenylammonium chloride (from Aldrich) by means of ion exchange through the anion exchange resin Lewatit® 500 (from Bayer AG).

Example 4

Perfluorobutanesulfonic acid benzyltrimethylammonium salt is prepared by neutralising perfluorobutanesulfonic acid and benzyltrimethylammonium hydroxide in aqueous solution. Benzyltrimethylammonium hydroxide is obtainable from Aldrich.

Example 5

Perfluorobutanesulfonic acid tetramethylammonium salt is prepared by neutralising perfluorobutanesulfonic acid and tetramethylammonium hydroxide in aqueous solution. Tetramethylammonium hydroxide is obtainable from Aldrich.

Example 6

Perfluorobutanesulfonic acid tetrapropylammonium salt is prepared by neutralising perfluorobutanesulfonic acid and tetrapropylammonium hydroxide in aqueous solution. Tetrapropylammonium hydroxide is obtainable from Aldrich.

Example 7

Perfluorobutanesulfonic acid tetrahexylammonium salt is prepared by neutralising perfluorobutanesulfonic acid and tetrahexylammonium hydroxide in aqueous solution. Tetrahexylammonium hydroxide is obtainable from Fluka.

Example 8

Making the Test Mouldings

In order to make the test mouldings, an additive-free, unstabilised polycarbonate (Makrolon® 2808 from Bayer AG, Leverkusen) of average molecular weight approximately 30 000 ($M_W$ determined by GPC), solution viscosity: η=1.293 at 290 to 300° C., is compounded in a twin-screw extruder with the quantity of sulfonic acid salts (according to Examples 2 to 7) indicated in Table 1 and the other additives indicated, and is then granulated.

Rectangular sheets (155 mm×75 mm×2 mm) are then injection-moulded from this granular material at a material temperature of 300 or 320° C. The colour of the rectangular sheets is then compared visually with rectangular sheets not having the sulfonium salts according to the invention (Example 8.1), which have been made in parallel. Finally, the rectangular sheets undergo the dust test. The results are indicated in Table 2.

TABLE 1

Plastic compositions

| Example | Composition | Material temperature for injection moulding |
|---|---|---|
| 8.1 | 0.025% triphenylphosphine + 0.3% 2-(2'-hydroxy-3'-(2-butyl)-5'-(tert.-butyl)phenyl) benzotriazole | 300 |
| 8.2 | 0.3% perfluorooctanesulfonic acid tetramethylammonium salt + 0.025% triphenylphosphine + 0.3% 2-(2'-hydroxy-3'-(2-butyl)-5'-(tert.-butyl)phenyl) benzotriazole | 320 |
| 8.3 | 0.4% perfluorooctanesulfonic acid tetraethylammonium salt (Bayowet 248 ®, Bayer AG, Leverkusen) + 0.025% triphenylphosphine + 0.3% 2-(2'-hydroxy-3'-(2-butyl)-5'-(tert.-butyl)phenyl) benzotriazole (Tinuvin ® 350, Ciba Spezialitätenchemie, Basle) | 300 |
| 8.4 | 0.3% perfluorobutanesulfonic acid tetrapropylammonium salt + 0.04% triphenylphosphine + 0.3% 2-(2'-hydroxy-3'-(2-butyl)-5'-(tert.-butyl)phenyl) benzotriazole | 300 |
| 8.5 | 0.3% perfluorobutanesulfonic acid tetrabutylammonium salt (Fluka) + 0.04% triphenylphosphine + 0.3% 2-(2'-hydroxy-3'-(2-butyl)-5'-(tert.-butyl)phenyl) benzotriazole | 300 |
| 8.6 | 0.4% perfluorobutanesulfonic acid tetrahexylammonium salt + 0.04% triphenylphosphine + 0.3% 2-(2'-hydroxy-3'-(2-butyl)-5'-(tert.-butyl)phenyl) benzotriazole | 320 |
| 8.7 | 1% perfluorobutanesulfonic acid trimethylneopentylammonium salt + 0.025% triphenylphosphine + 0.3% 2-(2'-hydroxy-3'-(2-butyl)-5'-(tert.-butyl)phenyl) benzotriazole | 300 |
| 8.8 | 0.3% perfluorobutanesulfonic acid benzyltrimethylammonium salt + 0.025% triphenylphosphine + 0.3% 2-(2'-hydroxy-3'-(2-butyl)-5'-(tert.-butyl)phenyl) benzotriazole | 300 |
| 8.9 | 1% perfluorobutanesulfonic acid trimethylphenylammonium salt + 0.025% triphenylphosphine + 0.3% 2-(2'-hydroxy-3'-(2-butyl)-5'-(tert.-butyl)phenyl) benzotriazole | 300 |

TABLE 2

Results of dust test and optical inspection

| Example | Result of dust test | Discoloration compared with Example 8.1 |
|---|---|---|
| 8.1 | – | — |
| 8.2 | – | no change, slight turbidity |
| 8.3 | + | more yellowish |
| 8.4 | + | no change |
| 8.5 | + | no change |
| 8.6 | + | no change |
| 8.7 | + | no change |
| 8.8 | + | more yellowish |
| 8.9 | + | more yellowish |

The results in Table 2 show that in comparison with conventional sulfonium salts only the sulfonium salts according to the invention both have an antistatic effect within the meaning of no fixation of dust after injection moulding, and also show no additional yellowing during processing.

Example 9

30.2 g perfluorobutanesulfonyl fluoride (0.1 mole, Aldrich) and 6.0 g dimethyldimethoxysilane (0.05 mole, Fluka) in 70 ml dry tert.-butylmethylether (Aldrich) are introduced into a 250 ml three-necked flask, and 14.3 g tripropylamine (0.1 mole, Aldrich) are added slowly at room temperature under nitrogen. The reaction solution is then heated under reflux for 3 h, and the precipitated product is then filtered off, washed with ether and dried. Yield: 32.6 g of white solid of N-methyltripropylammonium perfluorobutyl sulfonate.

Example 10

30.2 g perfluorobutanesulfonyl fluoride (0.1 mole, Aldrich) and 8.8 g diethyldiethoxysilane (0.05 mole, Fluka) in 70 ml dry tert.-butylmethylether (Aldrich) are introduced into a 250 ml three-necked flask, and 14.3 g tripropylamine (0.1 mole, Aldrich) are added slowly at room temperature under nitrogen. The reaction solution is then heated under reflux for 3 h, and the precipitated product is then filtered off, washed with ether and dried. Yield: 8 g of white solid of N-ethyltripropylammonium perfluorobutyl sulfonate.

Example 11

30.2 g perfluorobutanesulfonyl fluoride (0.1 mole, Aldrich) and 7.3 g methyltripropoxysilane (0.033 mole, Aldrich) in 70 ml dry tert.-butylmethylether (Aldrich) are introduced into a 250 ml three-necked flask, and 14.3 g tripropylamine (0.1 mole, Aldrich) are added slowly at room temperature under nitrogen. The reaction solution is then stirred at room temperature for 8 h, and the precipitated product is then filtered off, washed with ether and dried. Yield: 19.3 g of white solid of tetrapropylammonium perfluorobutyl sulfonate.

Example 12

30.2 g perfluorobutanesulfonyl fluoride (0.1 mole, Aldrich) and 6.0 g dimethyldimethoxysilane (0.05 mole, Fluka) in 100 ml dry cyclohexane (Aldrich) are introduced into a 250 ml three-necked flask, and 11.52 g N,N-diisopropylmethylamine (0.1 mole, Fluka) are added slowly at room temperature under nitrogen. The reaction solution is then stirred at room temperature for 7 h, and the precipitated product is then filtered off, washed with hexane and tert.-butylmethylether and dried. Yield: 14.4 g of white solid of dimethyldiisopropylammonium perfluorobutyl sulfonate.

Example 13

30.2 g perfluorobutanesulfonyl fluoride (0.1 mole, Aldrich) and 6.0 g dimethyldimethoxysilane (0.05 mole, Fluka) in 100 ml dry cyclohexane (Aldrich) are introduced into a 250 ml three-necked flask, and 18.4 g tributylamine (0.1 mole, Aldrich) are added slowly at room temperature under nitrogen. The reaction solution is then stirred at room temperature for 4 h, then heated under reflux for 1 hour, and the precipitated product is then filtered off, washed with ether and dried. Yield: 6.5 g of white solid of N-methyltributylammonium perfluorobutyl sulfonate.

Example 14

30.2 g perfluorobutanesulfonyl fluoride (0.1 mole, Aldrich) and 6.0 g dimethyldimethoxysilane (0.05 mole, Fluka) in 70 ml dry tert.-butylmethylether (Aldrich) are introduced into a 250 ml three-necked flask, and 15.5 g N,N-diethylcyclohexylamine (0.1 mole, Aldrich) are added slowly at room temperature under nitrogen. The reaction solution is then stirred at room temperature for 1 h, then heated under reflux for 3 h, and the precipitated product is then filtered off, washed with ether and dried. Yield: 40 g of white solid of cyclohexyldiethylmethylammonium perfluorobutyl sulfonate.

Example 15

30.2 g perfluorobutanesulfonyl fluoride (0.1 mole, Aldrich) and 6.0 g dimethyldimethoxysilane (0.05 mole, Fluka) in 70 ml dry tert.-butylmethylether (Aldrich) are introduced into a 250 ml three-necked flask, and 12.7 g N,N-dimethylcyclohexylamine (0.1 mole, Aldrich) are added slowly at room temperature under nitrogen. The reaction solution is then stirred at room temperature for 8 h, and the precipitated product is then filtered off, washed with ether and dried. Yield: 39 g of white solid of cyclohexyltrimethylammonium perfluorobutyl sulfonate.

Example 16

30.2 g perfluorobutanesulfonyl fluoride (0.1 mole, Aldrich) and 6.0 g dimethyldimethoxysilane (0.05 mole, Fluka) in 100 ml dry tert.-butylmethylether (Aldrich) are introduced into a 250 ml three-necked flask, and 8.7 g N,N-dimethylisopropylamine (0.1 mole, Aldrich) are added slowly at room temperature under nitrogen. The reaction solution is then stirred at room temperature for 8 h, and the precipitated product is then filtered off, washed with ether and dried. Yield: 33 g of white solid of isopropyltrimethylammonium perfluorobutyl sulfonate.

Example 17

30.2 g perfluorobutanesulfonyl fluoride (0.1 mole, Aldrich) and 6.0 g dimethyldimethoxysilane (0.05 mole, Fluka) in 100 ml dry tert.-butylmethylether (Aldrich) are introduced into a 250 ml three-necked flask, and 19.5 g N,N-methyldicyclohexylamine (0.1 mole, Aldrich) are added slowly at room temperature under nitrogen. The reaction solution is then stirred at room temperature for 8 h, and the precipitated product is then filtered off, washed with ether and dried. Yield: 38 g of white solid of dicyclohexyldimethylammonium perfluorobutyl sulfonate.

Example 18

212.5 g perfluorobutanesulfonyl fluoride (0.7 mole, Aldrich) and 42.2 g dimethyldimethoxysilane (0.35 mole, Fluka) in 490 ml dry tert.-butylmethylether (Aldrich) are introduced into a 1000 ml three-necked flask, and 91 g N,N-diisopropylethylamine (0.7 mole, Aldrich) are added slowly at room temperature under nitrogen. The reaction solution is then stirred at room temperature for 8 h, and the precipitated product is then filtered off, washed with ether and dried. Yield: 159 g of white solid of methylethyldiisopropylammonium perfluorobutyl sulfonate.

Example 19

In a manner analogous to Example 8 rectangular sheets are prepared by compounding followed by injection moulding, in accordance with Table 3, and undergo the dust test. The results are indicated in Table 4.

TABLE 3

Plastic compositions

| Example | Composition | Material temperature for injection moulding |
|---|---|---|
| 19.1 | 0.05% triphenylphosphine + 0.3% 2-(2'-hydroxy-3'-(2-butyl)-5'-(tert.-butyl)phenyl) benzotriazole (Tinuvin ® 350, Ciba Spezialitätenchemie, Basle) + 0.05% octadecyl-3-(3',5'-di-tert.-butyl-4'-hydroxyphenyl) propionate (Irganox 1076, Ciba Spezialitätenchemie, Basle) + 0.3% N-methyltripropylammonium perfluorobutyl sulfonate (Example 9) | 320 |
| 19.2 | 0.04% triphenylphosphine + 0.3% 2-(2'-hydroxy-3'-(2-butyl)-5'-(tert.-butyl)phenyl) benzotriazole + 0.4% N-ethyltripropylammonium perfluorobutyl sulfonate (Example 10) | 300 |
| 19.3 | 0.05% triphenylphosphine + 0.3% 2-(2'-hydroxy-3'-(2-butyl)-5'-(tert.-butyl)phenyl) benzotriazole + 0.1% dimethyldiisopropylammonium perfluorobutyl sulfonate (Example 12) | 310 |
| 19.4 | 0.05% triphenylphosphine + 0.3% 2-(2'-hydroxy-3'-(2-butyl)-5'-(tert.-butyl)phenyl) benzotriazole + 0.2% N-methyltributylammonium perfluorobutyl sulfonate (Example 13) | 320 |
| 19.5 | 0.05% triphenylphosphine + 0.3% 2-(2'-hydroxy-3'-(2-butyl)-5'-(tert.butyl)phenyl) benzotriazole + 0.2% cyclohexyldiethylmethylammonium perfluorobutyl sulfonate (Example 14) | 300 |
| 19.6 | 0.05% triphenylphosphine + 0.3% 2-(2'-hydroxy-3'-(2-butyl)-5'-(tert.-butyl)phenyl) benzotriazole + 0.3% cyclohexyltrimethylammonium perfluorobutyl sulfonate (Example 15) | 320 |
| 19.7 | 0.05% triphenylphosphine + 0.3% 2-(2'-hydroxy-3'-(2-butyl)-5'-(tert.-butyl)phenyl) benzotriazole + 0.05% octadecyl-3-(3',5'-di-tert.-butyl-4'-hydroxyphenyl) propionate + 0.5% tetrabutylammonium trifluoromethane sulfonate (Aldrich) | 300 |
| 19.8 | 0.05% triphenylphosphine + 0.3% 2-(2'-hydroxy-3'-(2-butyl)-5'-(tert.-butyl)phenyl) benzotriazole + 0.3% isopropyltrimethylammonium perfluorobutyl sulfonate (Example 16) | 320 |
| 19.9 | 0.05% triphenylphosphine + 0.3% 2-(2'-hydroxy-3'-(2-butyl)-5'-(tert.-butyl)phenyl) benzotriazole + 0.3% dicyclohexyldimethylammonium perfluorobutyl sulfonate (Example 17) | 320 |
| 19.10 | 0.05% triphenylphosphine + 0.3% 2-(2'-hydroxy-3'-(2-butyl)-5'-(tert.-butyl)phenyl) benzotriazole + 0.2% methylethyldiisopropylammonium perfluorobutyl sulfonate (Example 18) | 320 |

TABLE 4

Results of dust test and optical inspection

| Example | Result of dust test | Discoloration compared with Example 8.1 |
|---|---|---|
| 19.1 | + | no change |
| 19.2 | + | slightly more yellowish |
| 19.3 | + | no change |
| 19.4 | + | no change |
| 19.5 | + | no change |
| 19.6 | + | no change |
| 19.7 | + | slightly more yellowish |
| 19.8 | + | no change |
| 19.9 | + | no change |
| 19.10 | + | no change |

The results in Table 4 show that in comparison with conventional sulfonium salts the sulfonium salts according to the invention both have an antistatic effect within the meaning of no fixation of dust after injection moulding, and also show no additional yellowing during processing.

Example 20

Makrolon 2808 is compounded with 0.05% triphenylphosphine, 0.3% 2-(2'-hydroxy-3'-(2-butyl)-5'-(tert.-butyl)phenyl) benzotriazole, 0.1% octadecyl-3-(3',5'-di-tert.-butyl-4'-hydroxyphenyl) propionate and 1.5% dimethyldiisopropyl-ammonium perfluorobutyl sulfonate (Example 12) as described in Example 8.

Example 21

The granules from Example 20 are mixed by shaking with granules of the polycarbonate product Makrolon A12647 from Bayer AG in accordance with Table 5 and in a manner analogous to Example 8 are injection-moulded to form rectangular sheets which undergo the dust test.

TABLE 5

Composition of the rectangular sheets, and dust test results

| Example | Granules Example 20 | Makrolon A12647 | Material temperature for injection moulding | Result of dust test |
|---|---|---|---|---|
| 21.1 | 0% | 100% | 320 | − |
| 21.2 | 6.7% | 93.3% | 320 | + |
| 21.3 | 10% | 90% | 320 | + |
| 21.4 | 13.3% | 86.7% | 300 | + |

Table 5 shows that moulding compositions according to the invention may also be prepared with the aid of an antistatic concentrate (pre-mixing, master batch).

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

The invention claimed is:

1. A method of increasing the antistatic properties of a plastic comprising including therein at least one antistatic agent selected from the group consisting of
   N-methyltripropylammonium perfluorobutyl sulfonate,
   N-ethyltripropylammonium perfluorobutyl sulfonate,
   dimethyldiisopropylammonium perfluorobutyl sulfonate,
   N-methyltributylammonium perfluorobutyl sulfonate,
   methylethyldiisopropylammonium perfluorobutyl sulfonate and combinations thereof.

2. A plastic composition comprising at least one plastic and an antistatic agent selected from the group consisting of
   N-methyltripropylammonium perfluorobutyl sulfonate,
   N-ethyltripropylammonium perfluorobutyl sulfonate,
   dimethyldiisopropylammonium perfluorobutyl sulfonate,
   N-methyltnbutylammonium pertluorobutyl sulfonate,
   methylethyldiisopropylammonium perfluorobutyl sulfonate and combinations thereof.

3. In a method of producing a plastic molding having an antistatic effect, the improvement comprising including at least one plastic composition according to claim 2 as a starting material.

4. The composition of claim 2, wherein the at least one plastic comprises a polycarbonate.

5. The plastic composition of claim 2 wherein said antistatic agent is present in an amount of 0.001 to 2 percent by weight.

6. The plastic composition of claim 2 wherein said antistatic agent is present in an amount of 0.1 to 1 percent by weight.

7. A process for preparing a plastic composition having increased antistatic properties comprising adding at least one antistatic agent selected from the group consisting of
   N-methyltripropylammonium perfluorobutyl sulfonate,
   N-ethyltripropylammonium perfluorobutyl sulfonate,
   dimethyldiisopropylammonium perfluorobutyl sulfonate,
   N-methyltributylammonium perfluorobutyl sulfonate,
   methylethyldiisopropylammonium perfluorobutyl sulfonate and combinations thereof to the plastic before, during or after the polymerization thereof.

8. In a method of producing a plastic molding composition, the improvement comprising adding to the molding composition at least one antistatic agent selected from the group consisting of
   N-methyltripropylammonium perfluorobutyl sulfonate,
   N-ethyltripropylammonium perfluorobutyl sulfonate,
   dimethyldiisopropylammonium perfluorobutyl sulfonate,
   N-methyltributylammonium perfluorobutyl sulfonate,
   methylethyldiisopropylammonium perfluorobutyl sulfonate and combinations thereof.

9. A plastic molding including at least one antistatic agent selected from the group consisting of
   N-methyltripropylammonium perfluorobutyl sulfonate,
   N-ethyltripropylammonium perfluorobutyl sulfonate,
   dimethyldiisopropylammonium perfluorobutyl sulfonate,
   N-methyltributylammonium perfluorobutyl sulfonate,
   methylethyldiisopropylammonium perfluorobutyl sulfonate and combinations thereof.

10. A plastic composition comprising:
   at least one plastic; and
   dimethyldiisopropylammonium perfluorobutyl sulfonate as an antistatic agent, wherein said antistatic agent is present in an amount of 0.1 to 1 percent by weight.

* * * * *